(12) United States Patent
Gaeta

(10) Patent No.: US 8,201,996 B1
(45) Date of Patent: Jun. 19, 2012

(54) PASSIVE WAVELENGTH-DIVISION MULTIPLEXING (WDM) FIBER-OPTIC TEMPERATURE SENSOR

(75) Inventor: Celestino John Gaeta, Carlsbad, CA (US)

(73) Assignee: IPITEK, Inc., Carlsbad, CA (US)

( * ) Notice: Subject to any disclaimer, the term of this patent is extended or adjusted under 35 U.S.C. 154(b) by 417 days.

(21) Appl. No.: 12/429,463

(22) Filed: Apr. 24, 2009

Related U.S. Application Data

(60) Provisional application No. 61/048,111, filed on Apr. 25, 2008.

(51) Int. Cl.
*G01K 11/32* (2006.01)
*G01K 11/20* (2006.01)

(52) U.S. Cl. .................. 374/131; 374/161; 374/121

(58) Field of Classification Search .................. 374/103, 374/131, 161, 162, 120, 121; 356/43
See application file for complete search history.

(56) References Cited

U.S. PATENT DOCUMENTS

| | | | |
|---|---|---|---|
| 4,558,217 A | 12/1985 | Alves | |
| 4,562,348 A | 12/1985 | Brogardh et al. | |
| 4,673,299 A * | 6/1987 | Dakin | 374/131 |
| 4,729,668 A | 3/1988 | Angel et al. | |
| 4,749,254 A | 6/1988 | Seaver | |
| 4,756,627 A | 7/1988 | Nelson | |
| 4,776,827 A * | 10/1988 | Greaves | 374/161 |
| 4,816,687 A | 3/1989 | Fehrenbach et al. | |
| 4,865,416 A | 9/1989 | Pratt | |
| 4,904,864 A | 2/1990 | Dakin et al. | |
| 5,028,146 A | 7/1991 | Wada | |
| 5,035,511 A | 7/1991 | Berthold | |
| 5,035,513 A | 7/1991 | Fehrenbach et al. | |
| 5,348,396 A * | 9/1994 | O'Rourke et al. | 374/161 |
| 5,730,134 A | 3/1998 | Dumoulin et al. | |
| 5,730,528 A | 3/1998 | Allison et al. | |
| 5,928,222 A | 7/1999 | Kleinerman | |
| 5,980,105 A * | 11/1999 | Rouhet et al. | 374/161 |
| 6,017,148 A * | 1/2000 | Rouhet et al. | 374/161 |
| 6,167,066 A * | 12/2000 | Gaeta et al. | 372/6 |
| 6,325,536 B1 | 12/2001 | Renken et al. | |
| 7,284,903 B2 | 10/2007 | Hartog | |
| 7,582,050 B2 | 9/2009 | Schlorff et al. | |
| 7,717,618 B2 | 5/2010 | Saxena et al. | |
| 2003/0185275 A1 | 10/2003 | Renschen et al. | |
| 2006/0077394 A1* | 4/2006 | Suzuki et al. | 356/479 |
| 2006/0245468 A1* | 11/2006 | Hartog | 374/161 |
| 2008/0304543 A1 | 12/2008 | Abe et al. | |
| 2009/0296778 A1 | 12/2009 | Kinugasa et al. | |

OTHER PUBLICATIONS

Paul R. Stauffer et al., U.S. Appl. No. 12/475,151, filed May 29, 2009, titled Thermal Monitoring Device.
Michael M. Salour, U.S. Appl. No. 12/475,044, filed May 29, 2009, titled Imaging Temperature Sensing System.
Michael M. Salour, U.S. Appl. No. 12/468,598, filed May 19, 2009, titled Multiple Sensing Tip Optical Fiber Thermometer.

* cited by examiner

*Primary Examiner* — Amy Cohen Johnson
(74) *Attorney, Agent, or Firm* — Burns & Levinson LLP; Jacob N. Erlich

(57) ABSTRACT

A passive wavelength-division multiplexing fiber-optic temperature sensor, as well as a distributed fiber-optic temperature sensing system, incorporates at least one wavelength-division-multiplexing optical coupler, so that any given sensor interfaces optically by at least one designated optical wavelength, thus providing means for any given fiber-optic temperature sensor to be distinguished from other fiber-optic temperature sensors of similar design operating on the same optical fiber system.

8 Claims, 4 Drawing Sheets

PASSIVE WAVELENGTH-DIVISION MULTIPLEXING (WDM) FIBER-OPTIC TEMPERATURE SENSOR

CROSS REFERENCE TO RELATED APPLICATIONS

This application claims priority of provisional application Ser. No. 61/048,111 filed Apr. 25, 2008 entitled PASSIVE WAVELENGTH-DIVISION MULTIPLEXING (WDM) FIBER-OPTIC TEMPERATURE SENSOR and which provisional application is incorporated herein in its entirety.

BACKGROUND

Various embodiments of this invention relate generally to fiber-optic sensors, and, more particularly, to fiber-optic temperature sensors in wavelength-division-multiplexed optical fiber systems.

Present-generation commercial fiber-optic temperature sensors employ optical fibers with diameters that are quite large compared to the type of fiber used for WDM systems. In order to use such sensors on a structure, a separate set of fiber-optic cables would have to be installed in addition to the WDM optical fiber.

It is therefore a need to develop a fiber-optic temperature sensor that can utilize the same WDM fiber without interfering with the other WDM systems and still accurately determine temperature even in the presence of some variations in optical power levels used in the sensor.

It is a further need to provide methods to distinguish multiple sensors from each other on the same optical fiber.

SUMMARY

The needs for the invention set forth above as well as further and other needs and advantages of the present invention are achieved by the embodiments of the invention described herein below.

Past contact fiber-optic fluorescence-decay measurement systems typically involve a single phosphor at the end of an optical fiber that can measure temperatures in a limited range including, but not limited to, a temperature range from −40 C to 250 C, with accuracy such as, but not limited to, ±1 C over the limited range. Higher accuracies including, but not limited to, ±0.2 C may be available in a more limited range of temperature. Other temperature ranges might be addressed with alternate phosphors. The past contact fiber-optic fluorescence-decay measurement systems typically allow a single measurement point per optical fiber.

The various embodiments of the invention described here are a fiber-optic temperature sensor based upon fluorescence-decay technology but allowing for optical cabling to employ a similar type of optical fiber used for present-day WDM systems, along with features making it compatible with the present-day WDM systems. In this way, the form of the fiber-optic sensor could be a fiber with phosphor on one end that could be connected with appropriate WDM optical couplers to a WDM fiber bus on structures at multiple convenient points to monitor temperature of particular structure locations or components, with a signal-conditioner/readout electronics connected to the WDM fiber bus on, within, or external to the structure.

An example of an embodiment of the temperature sensor could, but is not limited to include means for separating light, such as, but not limited to a wavelength division optical coupler, at a first plurality of optical wavelengths; means for absorbing the light, such as, but not limited to a phosphor, having at least one of the first plurality of optical wavelengths and emitting light having at least one of a second plurality of optical wavelengths; the emitted light incorporates features dependent upon the temperature of the absorbing means; and means for combining the light, such as, but not limited to a wavelength division optical coupler, at the at least one of the second plurality of optical wavelengths with other light at the second plurality of optical wavelengths; wherein temperature data is accessed according to selection of wavelength in order to determine the temperature of the absorbing means. In addition, a temperature sensor network can be formed by a plurality of sensing means, absorbing means, and combining means.

For a better understanding of the present invention, together with other and further needs thereof, reference is made to the accompanying drawings and detailed description and its scope will be pointed out in the appended claims.

DETAILED DESCRIPTION

A variety of sensing functions are required for structures including, but not limited to, aircraft. Examples include, but are not limited to, current, voltage, temperature, linear position, rotary position and pressure. This invention is a low cost, passive, fiber-optic sensor for monitoring temperature sensing for structures. Development of this class of sensor is consistent with the planned evolution of structure systems including, but not limited to, aircraft systems away from conventional copper cabling toward optical fiber for monitoring, communication, data transmission, and control functions.

Fiber-optic data links offer significant weight and space savings over present-generation equipment. Systems employing optical wavelength-division-multiplexing (WDM) formats including, but not limited to, coarse WDM (CWDM) and dense WDM (DWDM) formats allow for multiple communication channels (one for each wavelength of light) on each optical fiber are of particular interest. One fiber optic cable can replace multiple copper cables with a WDM approach. These types of WDM fiber optic systems are increasingly being utilized for data, communication, monitoring, and control function distribution in structures.

A WDM fiber-optic cable would generally carry light at a number N of wavelengths ($\lambda_1, \lambda_2, \ldots, \lambda_N$). Some of the wavelengths could be within, but are not limited to, either the 1310 nm or 1550 nm wavelength bands used for many WDM data and communication links. The WDM fiber-optic cable is typically designed to operate in a single, lowest-order spatial mode of optical propagation at these wavelengths.

Much lower wavelengths may be used for the temperature sensors and the light at these wavelengths could propagate in the fibers as multiple, higher-order spatial modes, which is acceptable for this type of sensor. It should be noted that past fluorescence-decay temperature sensors employ relatively large diameter optical fibers where the excitation and fluorescence light propagates as multiple, higher-order spatial modes.

Multiple temperature sensors may be individually addressed by assigning a unique phosphor-excitation wavelength to each sensor via an associated WDM optical coupler that extracts light at its excitation wavelength from a main WDM fiber optic bus line and directs it to a phosphor.

Figure 1:
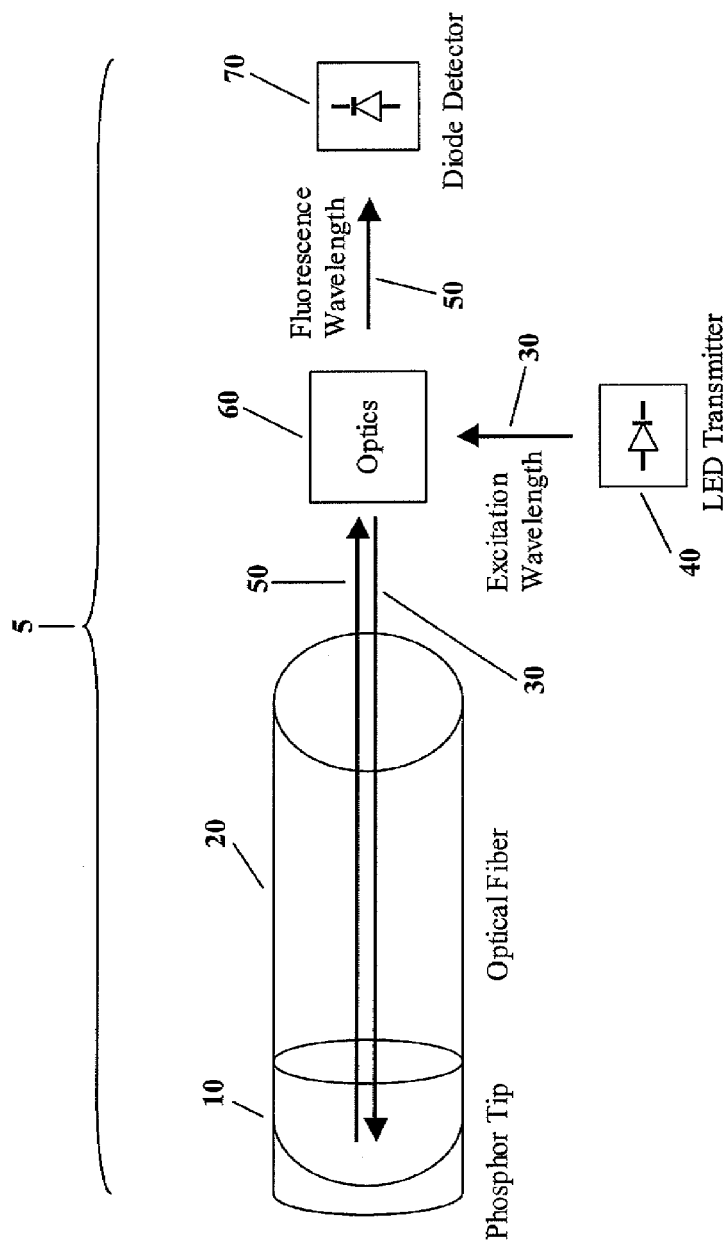
FIG. 1 is a schematic block diagram illustration of a temperature-dependent fluorescence-decay temperature sensor of an embodiment of the present invention, in which the components are shown in more detail in FIGS. 2 and 3.

The various embodiments of this invention utilize the temperature-dependent fluorescence-decay of an atomic resonance to measure temperature. In the temperature sensor 5 shown in FIG. 1, a phosphor 10, which exhibits such a temperature-dependent fluorescence-decay, is attached or connected by methods such as, but not limited to, bonding to a location generally, but not always, located substantially near the end of an optical fiber 20. In this embodiment, electromagnetic radiation such as, but not limited to, excitation light 30 in the form of optical pulses from a device such as, but not limited to, a low-power, broadband light-emitting diode (LED) source 40 propagates along the fiber 20 to the phosphor material 10. The phosphor 10 absorbs the optical energy from the optical pulses 30 at the excitation wavelength and spontaneously emits light 50 at the fluorescence wavelength. A portion of the fluorescence emission light 50 is captured by the optical fiber 20 and propagates back toward the LED source 40, where it is separated from the path of the excitation light 30 by optics 60 and directed to an optical detector 70.

While the excitation light pulse 30 is present at the phosphor 10, the fluorescence signal 50 slowly increases toward a maximum value. After the excitation light pulse 30 is switched off, the fluorescence signal 50 then begins to decay (decrease in power of signal). A higher temperature typically yields a faster decay process. A conventional calibration procedure is used to correlate the temporal decay process with the temperature of the phosphor 10.

Figure 2:
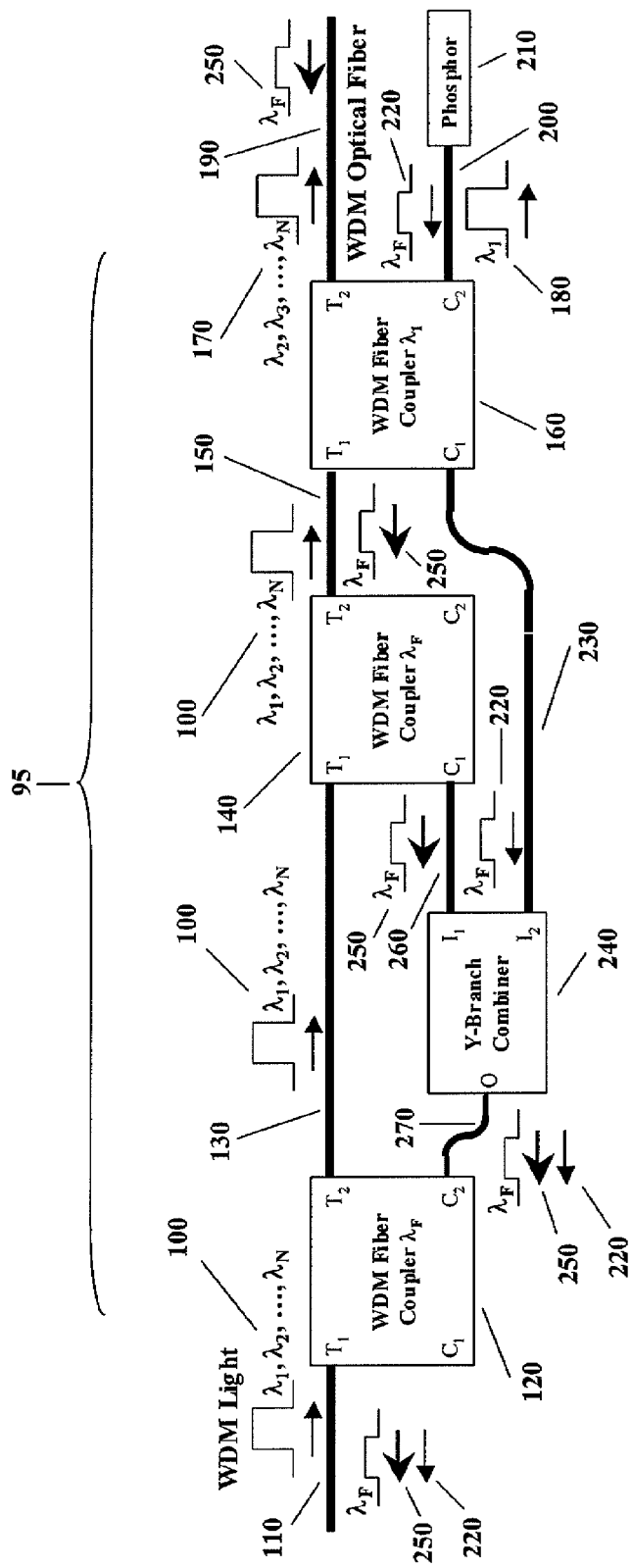
FIG. 2 is a schematic block diagram illustration of a fluorescence-decay temperature sensor with WDM excitation light.

In the embodiment 95 shown schematically in FIG. 2, WDM light 100 at multiple (quantity equal to N) WDM wavelengths propagating in an optical waveguide 110 such as, but not limited to, an optical fiber enters port $T_1$ of a WDM optical coupler 120, the WDM optical coupler 120 operating on light with an operating wavelength substantially near $\lambda_F$. The designation of operating wavelength associated with an optical coupler indicates that a majority of the light entering a port on one end of the device continues to the corresponding port ($T_1 \leftrightarrow T_2$ or $C_1 \leftrightarrow C_2$) on the other end of the device except for light with wavelength substantially near the operating wavelength, which is coupled to the cross port ($T_1 \leftrightarrow C_2$ or $C_1 \leftrightarrow T_2$). The WDM light 100 exits port $T_2$ of the WDM optical coupler 120, propagates in an optical waveguide 130, and enters port $T_1$ of a subsequent WDM optical coupler 140, the WDM optical coupler 140 also operating on light with a wavelength substantially near $\lambda_F$. Next, the WDM light 100 exits port $T_2$ of the WDM optical coupler 140, propagates in an optical waveguide 150, and enters port $T_1$ of WDM optical coupler 160, the WDM optical coupler 160 operating on light with a wavelength substantially near $\lambda_1$. The WDM optical coupler 160 acts to separate the WDM light 100 that has entered port $T_1$ of the WDM optical coupler 160 so that a portion 170 of the WDM light 100 with wavelengths not substantially near $\lambda_1$ exit from port $T_2$ of the WDM optical coupler 160 and a different portion 180 (30) of the WDM light 100 with wavelengths substantially near $\lambda_1$ exit from port $C_2$ of the WDM optical coupler 160. The portion 170 of the WDM light 100 with wavelengths not substantially near $\lambda_1$ then propagate in optical waveguide 190, while the portion 180 of the WDM light 100 with wavelengths substantially near $\lambda_1$ propagate in optical waveguide 200 until reaching a phosphor 210 (10). The phosphor 210 (10) substantially absorbs the portion 180 (30) of the WDM light 100 with wavelengths substantially near $\lambda_1$ and subsequently emits substantially broadband fluorescence light 220 (50) with wavelengths substantially near $\lambda_F$.

The fluorescence light 220 (50) from the phosphor 210 (10) then sequentially propagates in the optical waveguide 200, enters port $C_2$ of the WDM optical coupler 160, exits port $C_1$ of the WDM optical coupler 160, propagates in an optical waveguide 230, and enters port $I_2$ of a 2×1 optical combiner 240. Examples of the 2×1 optical combiner 240 include, but are not limited to, a Y-branch integrated-optics combiner or a 2×1 optical-fiber coupler.

Other fluorescence light 250 from sources (not shown) such as, but not limited to, other temperature sensor embodiments 95, also at wavelengths substantially near $\lambda_F$, returning along the WDM optical waveguide 190 sequentially enters port $T_2$ of the WDM optical coupler 160, exits through port $T_1$ of the WDM optical coupler 160, propagates in the optical waveguide 150, enters port $T_2$ of the WDM optical coupler 140, couples over and exits through port $C_1$ of the WDM optical coupler 140, propagates in an optical waveguide 260, and enters port $I_1$ of the 2×1 optical combiner 240.

The 2×1 optical combiner 240 causes some or substantially all of the fluorescence light 220 (50) entering port $I_2$ of the 2×1 optical combiner 240 and some or substantially all of the fluorescence light 250 entering port $I_1$ of the 2×1 optical combiner 240 to exit through port O of the 2×1 optical combiner 240. The fluorescence light 220 and/or the fluorescence light 250 exiting port O of the 2×1 optical combiner 240, then sequentially propagates in an optical waveguide 270, enters port $C_2$ of the WDM optical coupler 120, exits port $T_1$ of the WDM optical coupler 120, and propagates in the optical waveguide 110 for subsequent detection and processing elsewhere.

Different phosphors, generally with different excitation ($\lambda_1, \lambda_2, \ldots, \lambda_N$) and fluorescence wavelengths ($\lambda_F$), may be used together on the same WDM optical bus line. But certain individual sensors, those sensors with a similar phosphor, may be accessed by time multiplexing of their individual excitation wavelengths in order to better discriminate between them, since their fluorescence light will substantially be at the same wavelength.

Figure 3:
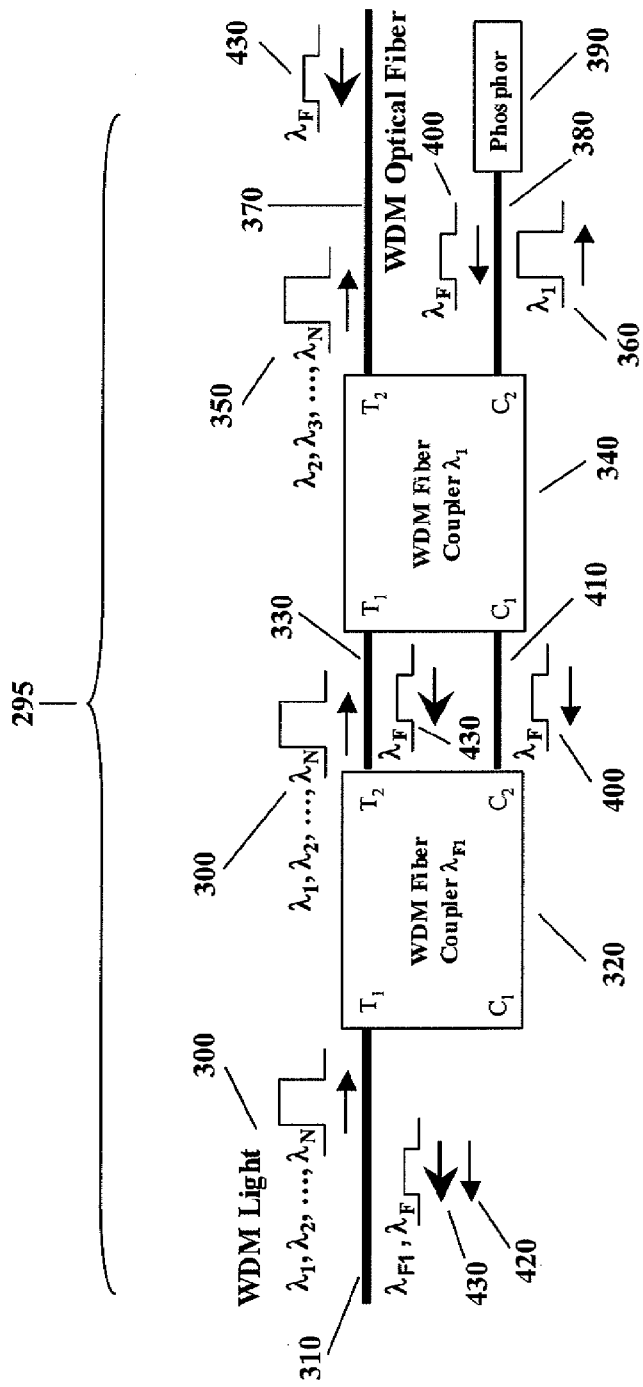
FIG. 3 is a schematic block diagram illustration of a fluorescence-decay temperature sensor with WDM excitation and WDM fluorescence light.

Another embodiment of a passive WDM fiber-optic temperature sensor 295, in which all sensors may be accessed simultaneously, is shown in FIG. 3. In this embodiment, WDM light 300 at multiple (quantity equal to N) WDM wavelengths that is propagating in an optical waveguide 310 enters port $T_1$ of a WDM optical coupler 320, the WDM optical coupler 320 operating on light with a wavelength substantially near $\lambda_{F1}$ and a bandwidth that is substantially narrower than the bandwidth of the total fluorescence near wavelength $\lambda_F$, where wavelength $\lambda_{F1}$ is located within the total fluorescence bandwidth near wavelength 4. The WDM light 300 exits port $T_2$ of the WDM optical coupler 320, propagates in an optical waveguide 330, and enters port $T_1$ of a subsequent WDM optical coupler 340, the WDM optical coupler 340 operating on light with a wavelength substantially near $\lambda_1$.

The WDM optical coupler 340 acts to separate the WDM light 300 that has entered port $T_1$ of the WDM optical coupler 340 so that a portion 350 of the WDM light 300 with wavelengths not substantially near exit from port $T_2$ of the WDM optical coupler 340 and a different portion 360 (30) of the WDM light 300 with wavelengths substantially near $\lambda_1$ exit from port $C_2$ of the WDM optical coupler 340. The portion 350 of the WDM light 300 with wavelengths not substantially near $\lambda_1$ then propagate in optical waveguide 370, while the portion 360 (30) of the WDM light 300 with wavelengths substantially near $\lambda_1$ propagate in optical waveguide 380 until reaching a phosphor 390 (10). The phosphor 390 (10) substantially absorbs the portion 360 (30) of the WDM light 300 with wavelengths substantially near $\lambda_1$ and subsequently emits substantially broadband fluorescence light 400 (50) with wavelengths substantially near $\lambda_F$.

The broadband fluorescence light 400 (50) from the phosphor 390 (10) then sequentially propagates in optical waveguide 380, enters port $C_2$ of the WDM optical coupler 340, exits port $C_1$ of the WDM optical coupler 340, propagates in an optical waveguide 410, and enters port $C_2$ of the WDM optical coupler 320.

The WDM optical coupler 320 acts to separate the broadband fluorescence light 400 (50) that has entered port $C_2$ of the WDM optical coupler 320 so that a portion of the broadband fluorescence light 400 (50) with wavelengths substantially outside of a substantially narrow bandwidth near $\lambda_{F1}$ are rejected at port $C_1$ of the WDM optical coupler 320 and a different portion 420 of the broadband fluorescence light 400 (50) with wavelengths substantially within a substantially narrow bandwidth near $\lambda_{F1}$ exit from port $T_1$ of the WDM optical coupler 320, and propagates in the optical waveguide 310 for subsequent detection and processing elsewhere.

Other fluorescence light 430 from sources (not shown) such as, but not limited to, other passive WDM fiber-optic temperature sensor embodiments 295, at wavelengths substantially near $\lambda_F$ but substantially outside of a substantially narrow bandwidth near $\lambda_{F1}$, returning along the WDM fiber-optic segment 370 sequentially enters port $T_2$ of the WDM optical coupler 340, exits through port $T_1$ of the WDM optical coupler 340, propagates in the optical waveguide 330, enters port $T_2$ of the WDM optical coupler 320, exits through port $T_1$ of the WDM optical coupler 320, and propagates in the optical waveguide 310 for subsequent detection and processing elsewhere.

Thus, each sensor is uniquely accessed and distinguished from other temperature sensors on the same WDM optical bus line via unique excitation and fluorescence wavelengths, and time multiplexing is not necessary as in the embodiment of FIG. 2 but may be employed. As in the case of the embodiment of FIG. 2, different phosphors, generally with different excitation ($\lambda_1, \lambda_2, \ldots, \lambda_N$) and fluorescence ($\lambda_F$) wavelengths, may be used together on the same WDM optical bus line.

Various embodiments may provide wavelength discrimination as means for controlling and/or distinguishing at least one temperature sensor on a fiber-optic network adapted for multiple uses.

In one embodiment, a fiber-optic temperature sensor may incorporate at least one wavelength-division-multiplexing fiber-optic coupler, so that any given sensor is accessed optically by a designated optical wavelength, thus providing a means for the sensor to be distinguished from other system components such as fiber-optic temperature sensors of similar design operating on the same optical fiber system.

In another embodiment, fiber-optic temperature sensor based upon temperature-dependent fluorescence-decay of a phosphor, may include at least one wavelength-division-multiplexing fiber-optic coupler, so that the phosphor of any given sensor is provided excitation light at a designated optical wavelength, thus providing a means for the sensor to be distinguished from other fiber-optic temperature sensors of similar design operating on the same optical fiber system. The excitation light to the sensors may be provided on a basis of time-division multiplexing to facilitate distinguishing between sensors with similar phosphors.

In yet another embodiment, a fiber-optic temperature sensor based upon temperature-dependent fluorescence-decay of a phosphor, may include at least one wavelength-division-multiplexing fiber-optic coupler, so that the phosphor of any given sensor is provided excitation light at a designated optical wavelength and only a portion, in a substantially narrow wavelength bandwidth near a second designated optical wavelength, of the total fluorescence light, is returned from the phosphor, thus providing a means for the sensor to be distinguished from other fiber-optic temperature sensors of similar design operating on the same optical fiber system.

Fiber-optic temperature sensors may be organized as a distributed network of fiber-optic sensors, and may also be accessed on a basis of time-division multiplexing.

Figure 4:
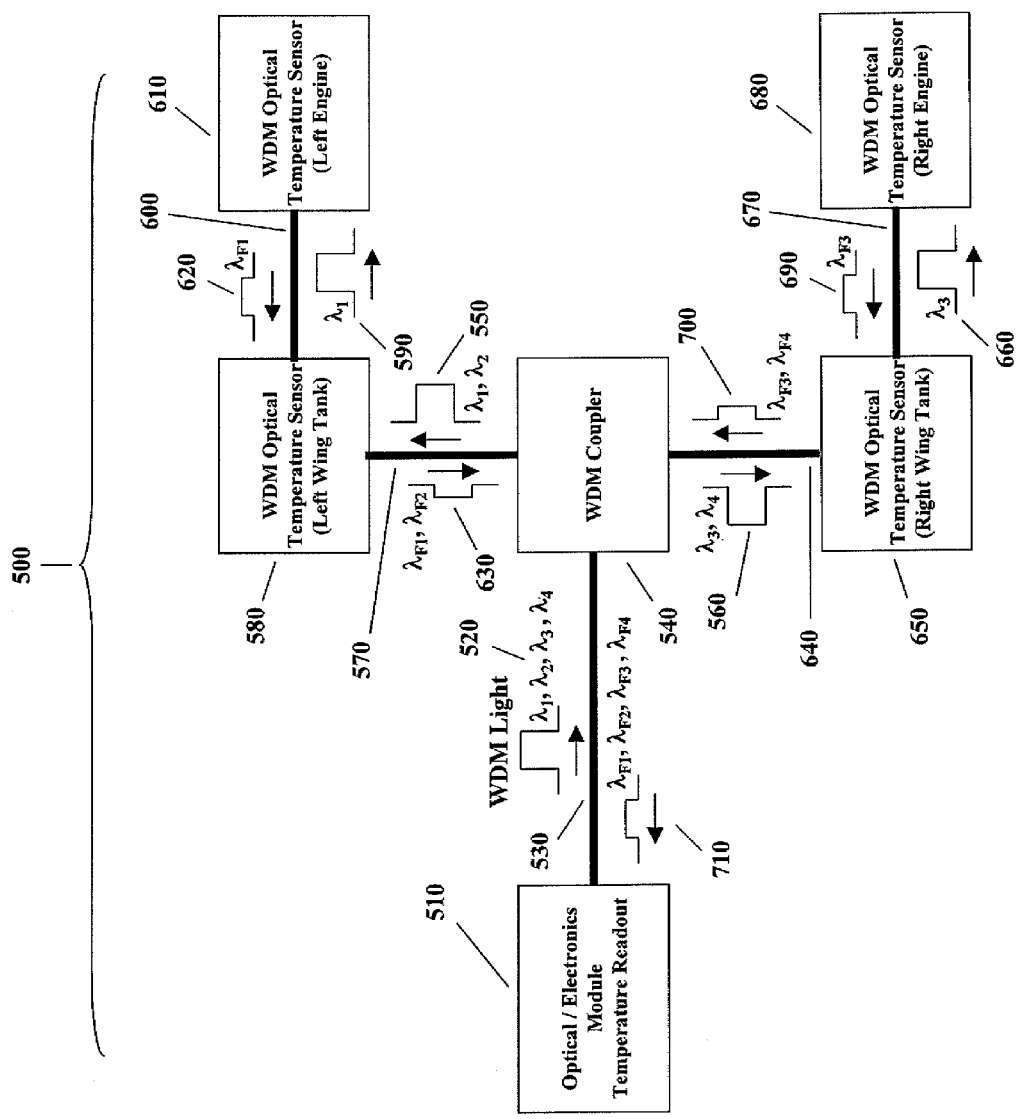
FIG. 4 is a schematic block diagram illustration of a WDM fluorescence-decay temperature example system to monitor temperature in an engine and wing fuel tanks of an aircraft.

FIG. 4 shows an example, but not limited to, embodiment of a passive WDM fiber-optic temperature system 500 in schematic block diagram form to measure and monitor temperatures in locations aboard an aircraft such as, but not limited to, wing fuel tanks and engines. An optical/electronics module 510 generates and sends WDM excitation light 520 at wavelengths $\lambda_1, \lambda_2, \lambda_3$, and $\lambda_4$ along a fiber optic conduit 530. A WDM optical coupler 540 separates the WDM excitation light 520 into WDM excitation light 550 (100 or 300) at wavelengths $\lambda_1$ and $\lambda_2$ and WDM excitation light 560 (100 or 300) at wavelengths $\lambda_3$ and $\lambda_4$.

The WDM excitation light 550 (100 or 300) propagates in fiber optic conduit 570 to a WDM optical temperature sensor 580 (95 or 295). The WDM optical temperature sensor 580 (95 or 295) substantially extracts the portion of the WDM excitation light 550 (100 or 300) at wavelength $\lambda_2$ and substantially outputs the remaining portion of the WDM excitation light 550 (100 or 300) at wavelength $\lambda_1$ that propagates as WDM excitation light 590 (170 or 350) at wavelength $\lambda_1$ in fiber optic conduit 600 (190 or 370) and is subsequently input by WDM optical temperature sensor 610 (95 or 295).

The WDM optical temperature sensor 610 (95 or 295) substantially absorbs the WDM excitation light 590 (170 or 350) at wavelength $\lambda_1$ and subsequently emits broadband fluorescence light 620 (250 or 430) with wavelengths substantially near $\lambda_{F1}$ that subsequently propagates in the fiber optic conduit 600 (190 or 370) to the WDM optical temperature sensor 580 (95 or 295).

The WDM optical temperature sensor 580 (95 or 295) substantially absorbs the portion of the WDM excitation light 550 (100 or 300) at wavelength $\lambda_2$ and subsequently emits broadband fluorescence light with wavelengths substantially near $\lambda_{F2}$ that is combined with the broadband fluorescence light 620 (250 or 430) with wavelengths substantially near $\lambda_{F1}$ and outputs the combination as broadband fluorescent light 630 (220 and 250 or 420 and 430) with wavelengths substantially near $\lambda_{F1}$ and $\lambda_{F2}$ that propagates in the fiber optic conduit 570 to the WDM optical coupler 540.

The WDM excitation light 560 (100 or 300) propagates in fiber optic conduit 640 to a WDM optical temperature sensor 650 (95 or 295). The WDM optical temperature sensor 650 (95 or 295) substantially extracts the portion of the WDM excitation light 560 (100 or 300) at wavelength $\lambda_4$ and substantially outputs the remaining portion of the WDM excitation light 560 (100 or 300) at wavelength $\lambda_3$ that propagates as WDM excitation light 660 (170 or 350) at wavelength $\lambda_3$ in fiber optic conduit 670 (190 or 370) and is subsequently input by WDM optical temperature sensor 680 (95 or 295).

The WDM optical temperature sensor 680 (95 or 295) substantially absorbs the WDM excitation light 660 (170 or 350) at wavelength $\lambda_3$ and subsequently emits broadband fluorescence light 690 (250 or 430) with wavelengths substantially near $\lambda_{F3}$ that subsequently propagates in the fiber optic conduit 670 (190 or 370) to the WDM optical temperature sensor 650 (95 or 295).

The WDM optical temperature sensor 650 (95 or 295) substantially absorbs the portion of the WDM excitation light 560 (100 or 300) at wavelength $\lambda_4$ and subsequently emits broadband fluorescence light with wavelengths substantially near $\lambda_{F4}$ that is combined with the broadband fluorescence light 690 (250 or 430) with wavelengths substantially near $\lambda_{F1}$ and outputs the combination as broadband fluorescent light 700 (220 and 250 or 420 and 430) with wavelengths substantially near $\lambda_{F3}$ and $\lambda_{F4}$ that propagates in the fiber optic conduit 640 to the WDM optical coupler 540.

The WDM optical coupler 540 outputs the combination of the broadband fluorescent light 630 (220 and 250 or 420 and 430) with wavelengths substantially near $\lambda_{F1}$ and $\lambda_{F2}$ and the broadband fluorescent light 700 (220 and 250 or 420 and 430) with wavelengths substantially near $\lambda_{F3}$ and $\lambda_{F4}$ as broadband fluorescent light 710 that subsequently propagates in the fiber optic conduit 530 to the optical/electronics module 510 for temperature data processing and temperature data output.

Embodiments of this invention including, but not limited to, the embodiments described above may be utilized to ascertain temperature of a given optical temperature sensor, such as an optical temperature sensor that is part of a network of sensors, by wavelength selection. More specifically, the temperature is determined via a conventional temperature calibration applied to the sensor temperature data that is accessed according to the wavelength selection. Optically addressed temperature sensors, other than those temperature sensors employing phosphors, can also be utilized within this invention. Further alternate devices can be used in place of wavelength-division optical couplers such as, but not limited to, thin-film interference devices, beam splitters, grating devices and the like.

Although the invention has been described with respect to various embodiments, it should be realized this invention is also capable of a wide variety of further and other embodiments within the spirit and scope of the appended claims.

What is claimed is:

1. A wavelength-division multiplexing optical temperature sensor comprising:
   means for separating light at a first plurality of optical wavelengths, the light enters the optical temperature sensor such that light having one of said first plurality of optical wavelengths substantially remain at the optical temperature sensor and light not having said one of said first plurality of optical wavelengths exit the optical temperature sensor;
   means for absorbing optical energy from said light having at least one of said first plurality of optical wavelengths and substantially simultaneously emitting light having at least one of a second plurality of optical wavelengths at a fluorescence wavelength of said absorbing means; said emitted light incorporates features dependent upon the temperature of said absorbing means; and
   means for combining said light at said at least one of said second plurality of optical wavelengths with other light at said second plurality of optical wavelengths;
   wherein temperature data is accessed according to selection of wavelength in order to determine said temperature of said absorbing means.

2. The optical temperature sensor of claim 1 further comprising:
   a plurality of absorbing means; and
   at least one of said absorbing means comprises a phosphor exhibiting fluorescence decay having said features dependent upon said temperature of said absorbing means.

3. The optical temperature sensor of claim 1 further comprising:
   a plurality of separating means; and
   at least one of said separating means comprises a wavelength division multiplexing optical coupler device.

4. The optical temperature sensor of claim 1 further comprising:
   a plurality of combining means; and
   at least one of said combining means comprises a wavelength division multiplexing optical coupler device.

5. The optical temperature sensor of claim 1 further comprising:
   a plurality of absorbing means, a plurality of separating means, and a plurality of combining means forming an optical temperature sensor network; and
   said optical temperature sensor network having optical/electronic means for operating said optical temperature sensor network.

6. The optical temperature sensor of claim 5 wherein at least one of said absorbing means comprises a phosphor exhibiting fluorescence decay having said features dependent upon said temperature of said absorbing means.

7. The optical temperature sensor of claim 5 wherein said at least one of said separating means comprises a wavelength division multiplexing optical coupler device.

8. The optical temperature sensor of claim 5 wherein said at least one of said combining means comprises a wavelength division multiplexing optical coupler device.

* * * * *